(12) United States Patent
Min et al.

(10) Patent No.: US 11,488,595 B2
(45) Date of Patent: Nov. 1, 2022

(54) USER-CUSTOMIZED AI SPEAKER-BASED PERSONALIZED SERVICE SYSTEM USING VOICEPRINT RECOGNITION

(71) Applicant: SOLUGATE INC., Seoul (KR)

(72) Inventors: Sung Tae Min, Seoul (KR); Joon Ho Park, Yangju-si (KR)

(73) Assignee: SOLUGATE INC., Seoul (KR)

( * ) Notice: Subject to any disclaimer, the term of this patent is extended or adjusted under 35 U.S.C. 154(b) by 308 days.

(21) Appl. No.: 16/805,601

(22) Filed: Feb. 28, 2020

(65) Prior Publication Data
US 2020/0320995 A1    Oct. 8, 2020

(30) Foreign Application Priority Data

Apr. 5, 2019   (KR) .......................... 10-2019-0039909

(51) Int. Cl.
*G10L 15/22*    (2006.01)
*G06F 21/32*    (2013.01)
*G10L 15/07*    (2013.01)

(52) U.S. Cl.
CPC .............. *G10L 15/22* (2013.01); *G06F 21/32* (2013.01); *G10L 15/07* (2013.01); *G10L 2015/223* (2013.01)

(58) Field of Classification Search
CPC ......... G10L 17/00; G10L 17/06; G10L 15/08; G10L 15/22; G10L 17/04; G10L 17/08; G10L 17/22; G10L 2015/223; G10L 2015/088; G06F 21/32; G06F 3/167; G06F 40/30; G06F 40/35; G06F 3/01; G06N 5/025; G06N 5/043; G06N 20/10; G06N 20/20; G06N 5/003

USPC ...................... 704/275, 270, 270.1, 246, 251
See application file for complete search history.

(56) References Cited

U.S. PATENT DOCUMENTS

| 10,923,130 | B2* | 2/2021 | Choi ..................... H04L 63/083 |
| 11,096,112 | B2* | 8/2021 | Choi ..................... H04W 12/06 |
| 2019/0251975 | A1* | 8/2019 | Choi ....................... G10L 17/00 |
| 2020/0005795 | A1* | 1/2020 | Chae ......................... G06N 3/08 |
| 2020/0057950 | A1* | 2/2020 | Dillon ....................... G06N 5/02 |

(Continued)

FOREIGN PATENT DOCUMENTS

| KR | 10-2018-0069660 A | 6/2018 |
| KR | 10-2019-0012066 A | 2/2019 |
| KR | 10-2019-0030081 A | 3/2019 |

*Primary Examiner* — Nvijay B Chawan
(74) *Attorney, Agent, or Firm* — Studebaker & Brackett PC

(57) ABSTRACT

Disclosed is a user-customized artificial intelligence (AI) speaker-based personalized service system using voiceprint recognition. The system is used by a small group of users. The system includes a voice recognition device that identifies each user through voice recognition and enables a voice instruction of each user to be executed, and a data processing device interconnected with the voice recognition device. The voice recognition device includes a storage unit that stores speech samples of respective registered users, a receiver that receives a first utterance of a first utterer, a determination unit that determines whether the first utterer is a registered user by comparing the first utterance of the first utterer against the speech samples of the respective registered users stored in the storage unit, and an execution that generates an instruction signal corresponding to a first instruction phrase uttered as a first voice instruction by the first utterer.

10 Claims, 3 Drawing Sheets

(56) References Cited

U.S. PATENT DOCUMENTS

2021/0195500 A1\* 6/2021 Choi ..................... H04W 12/06
2022/0013130 A1\* 1/2022 Oh ........................... G06T 7/20

\* cited by examiner

USER-CUSTOMIZED AI SPEAKER-BASED PERSONALIZED SERVICE SYSTEM USING VOICEPRINT RECOGNITION

CROSS REFERENCE TO RELATED APPLICATION

The present application claims priority to Korean Patent Application No. 10-2019-0039909, filed on Apr. 5, 2019, the entire contents of which are incorporated herein for all purposes by this reference.

BACKGROUND OF THE DISCLOSURE

1. Field of the Disclosure

The present invention relates to a user-customized artificial intelligence (AI) speaker-based personalized service system using voiceprint recognition. More particularly, the present invention relates to a user-customized artificial intelligence (AI) speaker-based personalized service system using voiceprint recognition, the personalized service system being capable of providing user-specific services by analyzing service use patterns of each user by using an integrated platform on which multiple AI assistants can operate through utterer recognition.

2. Description of the Related Art

Voice is the most common and convenient means for communicating information that humans use. Words expressed by voice are used not only as a means of communication between humans but also as a means of operating machines and devices. Recently, voice recognition technology has been advanced due to improvement of computer performance, development of various media, and development of signal and information processing technology.

In voice recognition technology, a computer analyzes or recognizes human voices by converting human voices (sound wave signals) into electrical signals using the principle that human voices have different frequencies according to the shape of the mouth and tongue. This technology recognizes voice by extracting frequency characteristics of the sound wave signals.

Recently, due to rapid spreading of various AI speakers, the number of households that own more than one AI speaker has increased. In addition, there are increasing cases where more than two AI speakers are used in one space. This is because AI assistants that are used vary from user to user.

To solve this problem, it is necessary to integrate multiple AI assistants to operate on one platform. Specifically, it is necessary to form an AI speaker in which multiple AI assistants modules are incorporated to identify and verify each user.

SUMMARY OF THE INVENTION

To solve the problem occurring in the related art, an objective of the present invention is to provide a technique of implementing multiple AI assistants on one platform (e.g., in one AI speaker) by installing multiple AI assistants modules in one AI speaker so that the AI speaker can identify and verify each of multiple users. That is, one AI speaker is shared among multiple users in using their AI assistants. That is, an objective of the present invention is to provide a user-customized artificial intelligence (AI) speaker-based personalized service system using voiceprint recognition, the personalized service system being capable of providing user-specific services through one platform by analyzing service use patterns of each user in a small group by using multiple AI assistants built in an AI speaker which can perform utterer verification.

In order to accomplish the objective of the present invention, there is provide a user-customized artificial intelligence (AI) speaker-based personalized service system using voiceprint recognition, the system including: a voice recognition device that is used by a predetermined group of users, identifies each of the users through voice recognition and enables execution of a voice instruction issued by a corresponding one of the users; and a data processing device interconnected with the voice recognition device, wherein the voice recognition device includes a storage unit to store a speech sample of each of the users, a receiver configured to receive a first utterance of a first utterer, a determination unit configured to compare the first utterance of the first utterer against the speech samples stored in the storage unit to determine whether the first utterer is a registered user, and an execution unit configured to generate an instruction signal corresponding to a first voice instruction uttered by the first utterer when it is determined that the first utterer is a registered user.

The receiver may include a wakeup-call receiver that receives a first wakeup call phrase uttered by the first utterer as the first utterance.

The wakeup-call receiver may transform the first wakeup call phrase into a sound wave signal.

The storage unit may include a wakeup-call storage unit that stores wakeup call phrases of respective registered users.

The determination unit may include a caller recognition unit that determines whether the first utterer is a registered user by comparing the first wakeup call phrase against the wakeup call phrases of the respective registered users.

When it is determined that the first utterer is a registered user, the voice recognition device may create a first instruction session to receive a voice instruction from the first utterer.

When a second utterer utters a second wakeup call phrase as a second utterance during the first instruction session, the wakeup-call receiver may receive the second wakeup call phrase and the caller recognition unit may determine whether the second utterer is a registered user by comparing the second wakeup call phrase against the registered wakeup call phrases. When it is determined that the second utterer is a registered user, the voice recognition device may create a second instruction session to receive a voice instruction from the second utterer.

The receiver may further include an instruction receiver that receives a first instruction phrase as the first voice instruction uttered by the first utterer.

The instruction receiver may transform the first instruction phrase into a sound wave signal.

The storage unit may further include an instruction storage unit that stores registered instruction phrases of each of the users.

The determination unit may further include an instruction phrase recognition unit that compares the first instruction phrase against the registered instruction phrases of the registered users and determines whether the first instruction phrase is a general instruction or a special instruction.

When the first instruction phrase is determined to be a general instruction, the execution unit may generate a general instruction signal for executing the general instruction._

The determination unit may further include a caller-utterer recognition unit. When the first instruction phrase is a special instruction, the caller-utterer recognition unit may compare the first instruction phrase against the registered instruction phrases to determine whether the first utterer is a registered user.

When it is determined that the first utterer is a registered user, the execution unit may generate a special instruction signal for executing the special instruction.

When a third utterer utters a second instruction phrase as a second voice instruction, in a case where the second instruction phrase is a general instruction, the execution unit may generate a general instruction signal for executing the general instruction.

When a third utterer utters a second instruction phrase as a second voice instruction, in a case where the second instruction phrase is a special instruction, the determination unit determines whether the first utterer and the third utterer are the same person. When it is determined that the third utterer and the first utterer are not the same person, the first instruction session may be closed.

When it is determined that the first utterer is not a registered user, the caller recognition unit compares the wakeup call phrase of the first utterer against the registered wakeup call phrases of the respective users.

An i-vector between the wakeup call phrase of the first utterer and each of the registered wakeup call phrases of the respective users is calculated. When the value of the i-vector indicating similarity is 0.8 or more, the first utterer is determined as a user belong to the group and the first utterer is asked to start a user registration process.

According to the present invention, one AI speaker is equipped with multiple AI assistants modules so that multiple AI assistants are executed on one platform (i.e., in an AI speaker). The multiple AI assistants can be used on one platform through voiceprint recognition. The AI speaker-based personalized service system according to the present invention can provide user-specific services by analyzing service use patterns of each registered user in a group through voice recognition.

The effects, advantages, and features of the present invention are not limited to the above-mentioned effects, advantages, and features, and other effects, advantages, and features of the present invention can be clearly understood from the following description.

DESCRIPTION OF THE PREFERRED EMBODIMENTS

Figure 1:
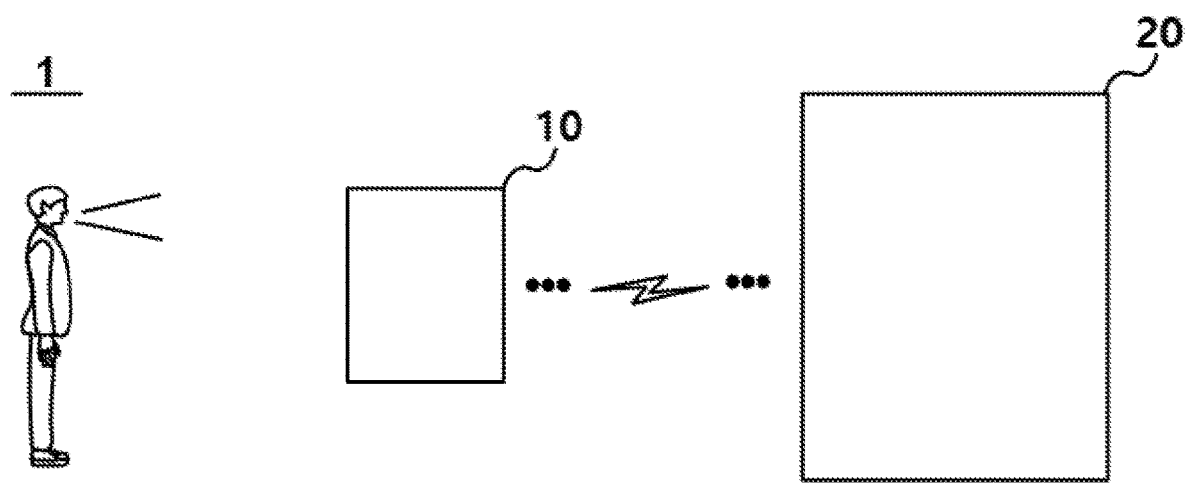
FIG. 1 is a schematic diagram of a user-customized artificial intelligence (AI) speaker-based personalized service system using voiceprint recognition, according to one exemplary embodiment of the present invention.
Figure 2:
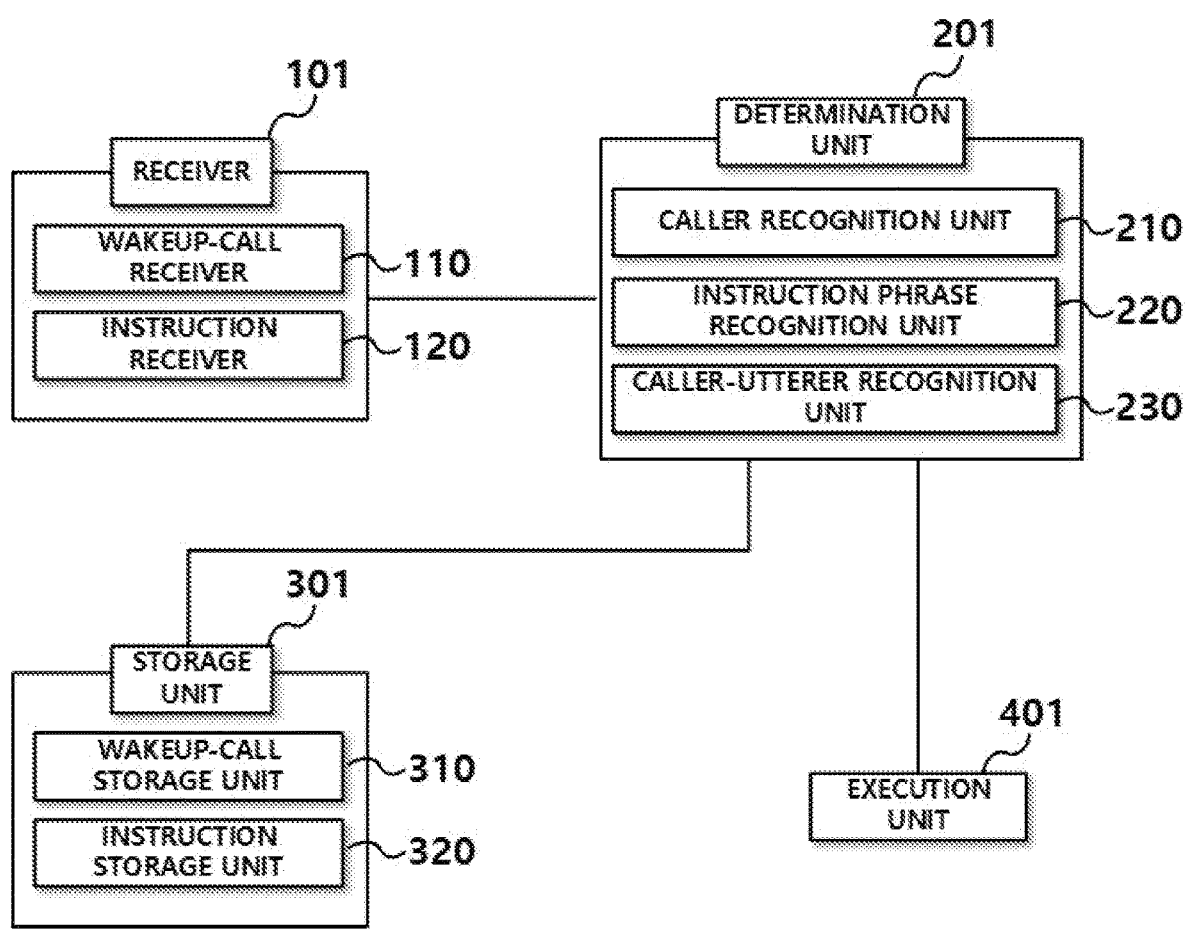
FIG. 2 is a block diagram of a voice recognition device of the user-customized artificial intelligence (AI) speaker-based personalized service system using voiceprint recognition, according to the exemplary embodiment of the present invention.
Figure 3:
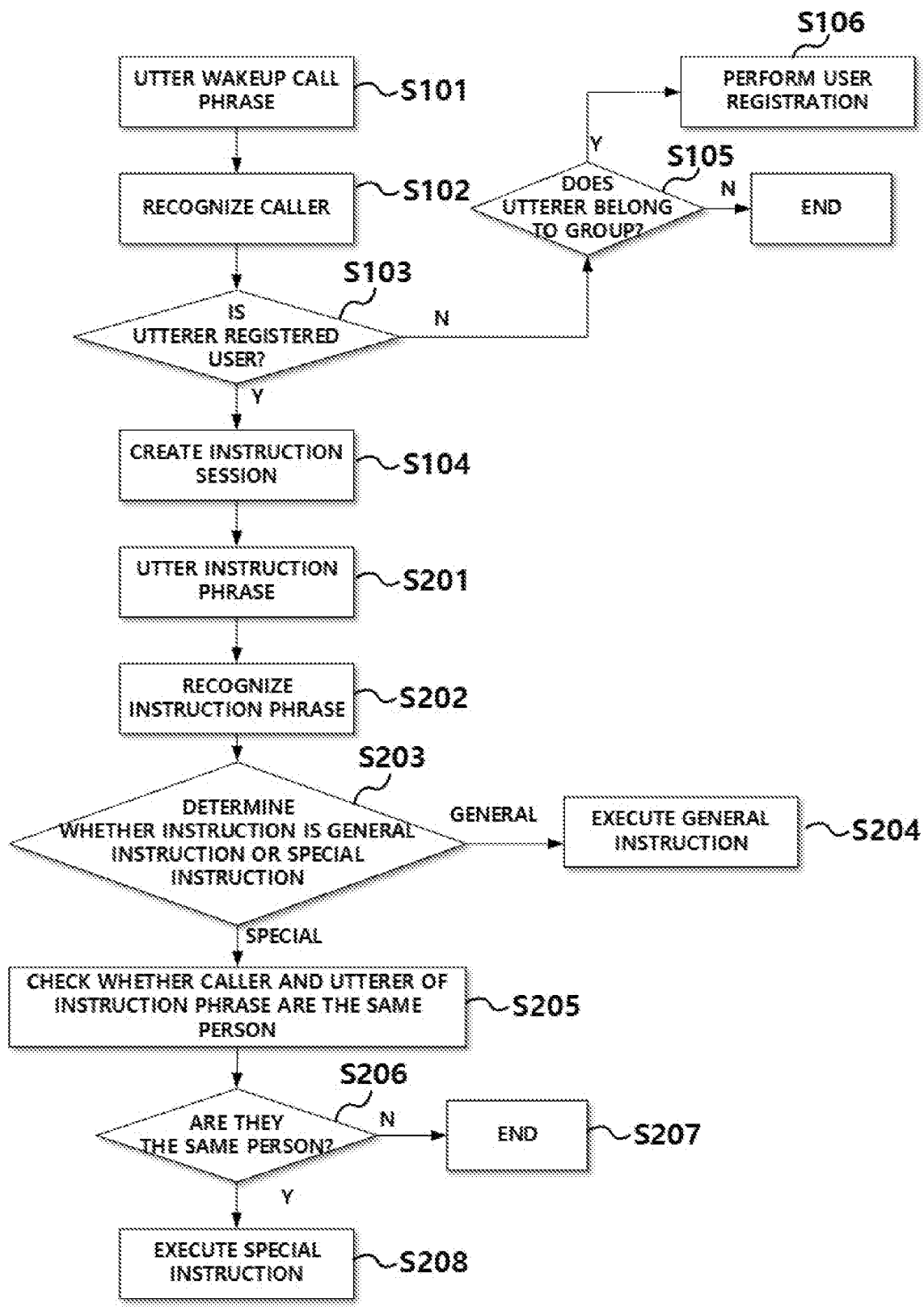
FIG. 3 is a flowchart illustrating a voiceprint recognition process of the voice recognition device of the user-customized artificial intelligence (AI) speaker-based personalized service system using voiceprint recognition, according to the exemplary embodiment of the present invention.

FIG. 1 is a schematic diagram of a user-customized artificial intelligence (AI) speaker-based personalized service system using voiceprint recognition, according to one exemplary embodiment of the present invention. FIG. 2 is a block diagram of a voice recognition device of the user-customized artificial intelligence (AI) speaker-based personalized service system using voiceprint recognition, according to the exemplary embodiment of the present invention. FIG. 3 is a flowchart illustrating a voiceprint recognition process of the voice recognition device of the user-customized artificial intelligence (AI) speaker-based personalized service system using voiceprint recognition, according to the exemplary embodiment of the present invention.

The advantages and features of the present disclosure and the manner of achieving them will become apparent with reference to the embodiments described in detail below and the accompanying drawings. The present invention may be, however, embodied in many different forms and should not be construed as being limited to the exemplary embodiments set forth herein. Rather, these embodiments are provided so that the present disclosure will be thorough and complete and will fully convey the concept of the invention to those skilled in the art. Thus, the present invention will be defined only by the scope of the appended claims. Herein below, preferred embodiments of the present invention will be described in detail with reference to the accompanying drawings. Like reference numbers denote like elements throughout the drawings, and the expression "and/or" represents each or any combination of listed items.

The terminology is used herein only for the purpose of describing elements and is not intended to limit the scope of the invention. As used herein, the singular forms "a", "an", and "the" are intended to include the plural forms as well, unless the context clearly indicates otherwise. It will be further understood that the terms "comprises" and/or "comprising," specify the presence of stated features, regions, integers, steps, operations, elements and/or components, but do not preclude the presence or addition of one or more other features, regions, integers, steps, operations, elements, components and/or groups thereof.

Unless the context clearly defines otherwise, all terms or words (including technical and scientific terms or words) used herein have the same meanings as common meanings understood by those skilled in the art to which the present invention belongs. Terms defined in a commonly, generally used dictionary are to be interpreted as having the same meanings as meanings used in the related art and should not be interpreted overly ideally unless this application clearly defines otherwise.

Hereinafter, user-customized artificial intelligence (AI) speaker-based personalized service system using voiceprint recognition, according to one embodiment of the present invention, will be described.

FIG. 1 is a schematic diagram of a user-customized artificial intelligence (AI) speaker-based personalized service system using voiceprint recognition, according to one exemplary embodiment of the present invention. FIG. 2 is a block diagram of a voice recognition device of the user-customized artificial intelligence (AI) speaker-based personalized service system using voiceprint recognition, according to the exemplary embodiment of the present invention. FIG. 3 is a flowchart illustrating a voiceprint recognition process of the voice recognition device of the user-customized artificial intelligence (AI) speaker-based personalized service system using voiceprint recognition, according to the exemplary embodiment of the present invention.

Referring to FIGS. 1 to 3, a user-customized artificial intelligence (AI) speaker-based personalized service system 1 using voiceprint recognition, according to one exemplary embodiment of the present invention, is used by a small group of users. The personalized service system 1 includes a voice recognition device 10 that can identify and verify each user through voice recognition so that a voice instruction of each registered user can be executed and a data processing device 20 interconnected with the voice recognition device 10. Herein, the small group of users may be a family, and the users may be members of the family.

The voice recognition device 10 is a key component in the present invention. The voice recognition device 10 can identify the voice of each of the users so that a voice instruction uttered by a corresponding one of the users can be executed.

Referring to FIGS. 2 and 3, the voice recognition device 10 of the personalized service system includes a storage unit 301 that stores speech samples of the respective registered users, a receiver 101 that receives a first utterance of a first utterer, a determination unit 102 that determines whether the first utterer is a registered user by comparing the first utterance of the first utterer against the speech samples of the respective registered users stored in the storage unit 301, and an execution 401 that generates an instruction signal corresponding to a first instruction phrase uttered by the first utterer as a first voice instruction.

A first utterer makes a first utterance to use the voice recognition device 10 (S101). The first utterance is received by the receiver 101. The receiver 101 includes a wakeup-call receiver 110 and an instruction receiver 120.

When the first utterer utters a first wakeup call phrase as the first utterance, the wakeup-call receiver 110 receives the first wakeup call phrase. The wakeup-call receiver 110 transforms the first wakeup call phrase into a sound wave signal and changes the same into voice data. The voice data corresponding to the first wakeup call phrase is transmitted to the determination unit 201.

The storage unit 301 includes a wakeup-call storage unit 310 and an instruction storage unit 320. The wakeup-call storage unit 310 stores wakeup call phrases uttered by respective registered users (hereinafter, referred to as registered wakeup call phrases). The registered wakeup call phrases are distinct sound patterns of the registered users and are used to verify the identity of each utterer. The wakeup-call storage unit 310 and the instruction storage unit 320 may be implemented in the form of storage devices such as a nonvolatile or volatile memory and a hard disk drive to store registered wakeup call phrases and registered instruction phrases.

The determination unit 210 compares the first utterance against speech samples stored in the storage unit 301 and determines whether the first utterer is a registered user. The determination unit 210 includes a caller recognition unit 210, an instruction phrase recognition unit 220, and a caller-utterer recognition unit 230.

The utterer recognition unit 210 of the determination unit 201 receives the first wakeup call phrase uttered by the first utterer from the wakeup-call receiver 110 and receives the registered wakeup call phrases stored in the wakeup-call storage unit. The utterer recognition unit 210 compares the first wakeup call phrase against the registered wakeup call phrases to determine that the first utterer is a registered user (S102). For example, the utterer recognition unit 210 compares the sound wave signal of the first wakeup call phrase against the sound wave signal of each of the registered wakeup call phrases. In this process, when there is a registered wakeup call phrase 90% or more portions of which matches the first wakeup call phrase, the first utterer who spoke the first wakeup call phrase is determined as a registered user. The utterer recognition unit 210 may be implemented in the form of software that can be executed by one or more processors built in a computing device 106.

When it is determined that the first utterer is a registered user (S103), the voice recognition device 10 opens a first voice instruction session for the first utterer (S104). When the first instruction session is started, the voice recognition device 10 is prepared to receive a first instruction phrase uttered by the first utterer.

On the other hand, when a second utterer who is a different user from the first utterer utters a second wakeup call phrase (called second speech during the first instruction session, the wakeup-call receiver 110 receives the second wakeup call phrase and the second wakeup-call recognition unit 210 determines whether the second utterer is a registered user by comparing the second wakeup call phrase uttered by the second utterer against the registered wakeup call phrases uttered by the respective users. When it is determined that the second utterer is a registered user, the voice recognition device opens a second instruction session for the second utterer. At this time, the first instruction session that is active is automatically closed.

In a case where no other voice instructions are not uttered by the speakers for a predetermined period of time, the first instruction session and the second instruction session are automatically closed. The predetermined period of time may be set in user settings. For example, the predetermined period of time may be 30 seconds or 1 minute.

On the other hand, when it is determined that the first utterer is not a registered user, the utterer recognition unit 210 compares the wakeup call phrase uttered by the first utterer against each of the registered wakeup call phrases of the respective registered users (S105).

Through this comparison process, an i-vector between the wakeup call phrase of the first utterer and each of the registered wakeup call phrases is calculated. When the value of the i-vector indicating similarity is 0.8 or more, the first utterer is determined as a user belong to the group. When the first utterer is determined as a user belong to the group, the voice recognition device 10 asks the first utterer to start a registration process (S106). The first utterer can be registered by fulfilling the requirements of the registration process. After being registered, the first utterer can access to the system.

When a first instruction session is started, the first utterer utters a first instruction phrase to issue a first voice instruction (S201). When the first voice instruction is made by the first utterer, the instruction receiver 120 of the receiver 101 receives the first voice instruction. The instruction receiver 120 transforms the first voice instruction into a sound wave signal and changes the same into voice data. The voice data corresponding to the first voice instruction is transmitted to the determination unit 201.

As described above, the storage unit 301 may include an instruction storage unit 320. The instruction storage unit 320 stores instruction phrases (hereinafter, referred to as registered voice instructions) uttered by the respective registered users, which are input through the registration process. The registered voice instructions of the respective user have unique vocal characteristics from user to user, thereby being used to identify the users.

The registered voice instructions include general instructions and special instructions. The general instructions refer less important tasks such as task of providing information. For example, the general instructions include an instruction to provide information such as time, date, and weather, an instruction to select a TV channel, and an instruction for a key word search. The generation instructions are instructions having nothing to do with personal information of each user.

The special instructions are relatively important instructions compared to general instructions. The special instructions are instructions having something to do with personal information of each user. For example, the special instructions include calling, text messaging, and final transactions (transferring of money, payment, etc.). The special instructions may be ranked in priority according to user settings. For example, the calling may be ranked lowest (Level 1 in priority), the text messaging may be ranked middle (Level 2 in priority), and the financial transactions (transfer or payment) may be ranked highest (Level 3 in priority). When there are minors among the users in the group, the authority of use of service of financial transactions (transfer or payment) may not be given to the minors.

Since the registered voice instructions are separately stores as general instructions and special instructions. On the other hand, since each voice instruction has a unique vocal characteristic, each instruction may be stored to have unique attributes. In addition, since the vocal characteristic vary from user to user, the registered voice instructions may be separately stored for each user.

As described above, the determination unit 201 may include an instruction phrase recognition unit 220. The instruction phrase recognition unit 220 compares the first voice instruction against the registered instruction phrases (S202). To this end, the registered instruction phrases are transmitted from the instruction storage unit 320 to the determination unit 201. The transmitted voice data corresponding to the first instruction phrase is compared with the voice data corresponding to the registered instruction phrase to determine whether the first instruction phrase is a general instruction or a special instruction (S203).

When it is determined that the first instruction phrase is a general instruction, the execution unit 401 generates a general instruction signal for executing the general instruction. Through this process, a general instruction (for example, providing information on time, date, and/or weather, selecting a TV channel, performing a simple search, etc.) is executed (S204).

On the other hand, when it is determined that the first instruction phrase is a special instruction, the voice features of the first instruction phrase are compared against the voice features of the registered instruction phrases to determine whether the first utterer is a registered user (S205, S206). The determination as to whether or not the first utterer is a registered user is performed by the caller-utterer recognition unit 230 of the determination unit 201.

In this case, when it is determined that the first utterer is a registered user, the execution unit 401 generates a special instruction signal for executing the special instruction. The data processing device 20 executes a special instruction according to the generated special instruction signal (S208). On the other hand, when the first utterer is not a registered user, the special instruction is not performed and the first instruction session is closed (S207).

When a third utterer who is not the first utterer utters a second instruction phrase as a second voice instruction in a state in which the first instruction session is still active, in a case where the second instruction phrase is determined to be a general instruction, the execution unit 401 generates a general instruction signal for executing the general instruction. That is, the voice recognition device 10 responds even to the general instruction of the third utterer who is not the first utterer.

On the other hand, when a third utterer who is not the first utterer utters a second instruction phrase as a voice instruction in a state in which the first instruction session is still active, in a case where the second instruction phrase is determined to be a special instruction, the caller-utterer recognition unit 230 of the determination unit 201 determines whether the third utterer and the first utterer are the same person. When it is determined that the third utterer and the first utterer are not the same person, the special instruction corresponding to the second instruction phrase is not executed and the first instruction session is closed.

Speaker authentication may be performed in a manner described below.

First, uttered phrases are classified as target phrases and test phrases for verification. A target phrase is denoted by Wtarget, and a test phrase is denoted by Wtest. When the voices of the members of a family are analyzed, the test may be performed up to, for example, five times.

$$S_{core} = \log_p(W_{target}, W_{test}|H_0) - \log_p(W_{target}, W_{test}|H_1)$$

Here, when the Wtarget and the Wtest are uttered by the same speaker (same person), H0 and H1 may be calculated by applying probabilistic linear discriminant analysis (PLDA) to the log calculation of Score.

$$S_{Score} = \frac{1}{2}\left[\sum_{j=1}^{2} w_j\right](2K+I)^{-1}\left[\sum_{j=1}^{2} w_j\right] - \frac{1}{2}\sum_{j=1}^{2}(w_j)^T(2K+I)^{-1}(w_j)$$

Here, $K=B^T(GG^T+\varepsilon)^{-1}B$ and $w_j=B(GG^T+\varepsilon)^{-1}(w_j\cdot\mu)$.

Here, B is a speaker model and G is a channel model.

In this way, similarity in voice between the speaker and each of the family members is calculated, and a user who is not registered and has similarity in voice to the family members, the user is asked to be registered.

In addition, it is possible to determine the intention of the speaker on the basis of the voice tone of the speaker. A voice instruction uttered by a speaker may be determined as a general instruction or a special instruction according to the voice tone. Accordingly, the actual intension of the speaker determined on the basis of the voice tone is considered so that an appropriate instruction can be executed according to the user's intention.

Next, the data processing device 20 performs a specific operation according to the instruction signal received from the voice recognition device 10.

The data processing device 20 may be an exemplary programmable processor, a computer, a system-on-chip device, or an arbitrary combination thereof. That is, examples of the data processing device 20 include devices and/or machines that can process data. Examples of the data processing device further includes special purpose logic circuitry, such as, a field programmable gate array (FPGA) or an application-specific integrated circuit (ASIC). Examples of the data processing device also include a hardware component or a code set for creating an execution environment for a computer program, such as processor firmware, protocol stacks, database management systems, operating systems, cross-platform runtime environments, virtual machines, and codes for configuring combinations thereof. The device and execution environment may constitute various computing model infrastructures, such as, web services, distributed computing infrastructures, and grid computing infrastructures.

A computer program (also called program, software, software application, script, or code) may be written in any form of programming language, including compiled or interpreted languages, descriptive or procedural languages, and the computer program may be deployed in an arbitrary form such as a standalone program or module, a component, a subroutine, an object, or other unit suitable for use in a computing environment. The computer program, although not required, may correspond to a file in a file system. A program may be stored in a part of a file (e.g., one or more scripts stored in a markup language document) that holds other programs or data, or in a single file dedicated to a program of interest, or multiple organized files (e.g., files that store one or more modules, sub-programs, or portions of code). A computer program may be deployed to be executed on one computer or on multiple computers, in which the one or multiple computers may be located at one site or distributed across multiple sites and may be connected to each other via a communication network.

The processes and logic flows may be performed by one or more programmable computers by operating input data and generating output, the programmable computers executing one or more computer programs to perform functions. The processes and logic flows and the devices may be performed and implemented by special purpose logic circuitry such as a field programmable gate array (FPGA) or an application specific integrated circuit (ASIC).

Processors suitable for the execution of a computer program include, for example, general and special purpose microprocessors and any one or more processors of any kind of digital computer. Generally, a processor may receive instructions and data from a read-only memory, a random access memory, or both. Essential elements of a computer are a processor for performing operations according to instructions and one or more memory devices for storing data and the instructions. Generally, a computer includes one or more mass storage devices (for example, magnetic disks, magneto-optical disks, and optical disks), receives or transmits data from or to one or more mass storage devices, or is operably connected to one or more mass storage devices. However, a computer may not necessarily include such devices. In addition, a computer may be embedded in, for example, a mobile telephone, a PDA, a mobile audio or video player, a game console, a global positioning system (GPS) receiver, or a portable storage device (e.g., a universal serial bus (USB) flash drive). Devices suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and memory may be supplemented by or integrated in special purpose logic circuitry.

Embodiments of the invention may be implemented, for example, as a data server incorporated in a computing system which includes a back-end component, a middleware component such as an application server, a front-end component such as a client computer with a graphical user interface (GUI) or a web browser for user interfacing for implementations of the subject matter described herein, or an arbitrary combination of one or more components of the back-end component, the middleware component, and the front-end component. The components of the system may be interconnected by an arbitrary form of communication network or a medium of digital data communication. Examples of communication networks include local area networks (LANs), wide area networks (WANs), inter-networks (for example, Internet), and peer-to-peer networks (for example, ad hoc peer-to-peer network).

A system of one or more computers may be configured to perform particular operations or actions by being equipped with a software component, a hardware component, or any combination thereof that causes the system to perform the particular operations or actions. One or more computer programs may be configured to perform particular operations or actions by including instructions that, when executed by a data processing device, cause the device to perform the actions.

While exemplary embodiments of the present invention have been described with reference to the accompanying drawings, those skilled in the art will appreciate that the present invention is not limited to the exemplary embodiments described above and can be implemented in other different forms without departing from the technical spirit or essential characteristics of the exemplary embodiments. Therefore, it can be understood that the exemplary embodiments described above are only for illustrative purposes and are not restrictive in all aspects.

What is claimed is:

1. A user-customized artificial intelligence (AI) speaker-based personalized service system using voiceprint recognition, the system comprising:
    a voice recognition device configured to verify each user of a group of users through voice recognition so that a voice instruction issued by each of the users can be performed; and a data processing device interconnected with the voice recognition device,
    wherein the voice recognition device comprises:
    a storage unit configured to store a speech sample of each of the users;
    a receiver configured to receive a first utterance of a first utterer;
    a determination unit configured to compare the first utterance against the speech samples stored in the storage unit; and
    an execution unit configured to generate an instruction signal corresponding to a first voice instruction uttered by the first utterer,
    wherein the receiver comprises a wake-up-call receiver,
    wherein the determination unit comprises a caller recognition unit,
    wherein the storage unit comprises a wakeup call phrase storage unit,
    wherein when the first utterer utters a first wakeup call phrase as the first utterance, the wake-up-call receiver receives the first wakeup call phrase, registered wakeup call phrases of the respective users are stored in the wake-up-call storage unit, the caller recognition unit compares the first wakeup call phrase against the registered wakeup call phrases to determine whether the first utterer is a registered user, and the voice recognition device creates a first instruction session for the first utterer when the first utterer is determined to be a registered user,
    wherein the storage unit further comprises an instruction storage unit in which registered instruction phrase of each of the registered users are stored,
    wherein the determination unit further comprises an instruction phrase recognition unit that compares the first instruction phrase against the registered instruction phrases of the registered users and determines whether the first instruction phrase is a general instruction or a special instruction, wherein when the first instruction phrase is determined to be a general instruction, the execution unit generates a general instruction signal for executing the general instruction, wherein the determination unit further comprises a caller-utterer recognition unit, and wherein when the first instruction phrase is a special instruction, the caller-utterer recognition unit compares the first instruction phrase against the registered instruction phrases to determine whether the first utterer is a registered user.

2. The system according to claim 1, wherein the wakeup-call receiver transforms the first wakeup call phrase into a sound wave signal.

3. The system according to claim 1, wherein when a second utterer utters a second wakeup call phrase as a second utterance during the first instruction session, the wakeup-call receiver receives the second wakeup call phrase, the caller recognition unit determines whether the second utterer is a registered user by comparing the second wakeup call phrase against the registered wakeup call phrases, and the voice recognition device creates a second instruction session for the second utterer when it is determined that the second utterer is a registered user.

4. The system according to claim 1, wherein the receiver further comprises an instruction receiver that receives a first instruction phrase uttered by the first utterer as a first voice instruction.

5. The system according to claim 4, wherein the instruction receiver transforms the first instruction phrase into a sound wave signal.

6. The system according to claim 4, wherein when a third utterer utters a second instruction phrase as a second voice instruction, in a case where the second instruction phrase is a general instruction, the execution unit generates a general instruction signal for executing the general instruction.

7. The system according to claim 4, wherein when a third utterer utters a second instruction phrase as a second voice instruction, in a case where the second instruction phrase is a special instruction, the determination unit determines whether the first utterer and the third utterer are the same person, and wherein when it is determined that the third utterer and the first utterer are not the same person, the first instruction session is closed.

8. The system according to claim 1, wherein when it is determined that the first utterer is a registered user, the execution unit generates a special instruction signal for executing the special instruction.

9. The system according to claim 1, wherein when it is determined that the first utterer is not a registered user, the caller recognition unit compares the first wakeup call phrase of the first utterer against the registered wakeup call phrases of the respective users.

10. The system according to claim 9, wherein an i-vector between the first wakeup call phrase of the first utterer and each of the registered wakeup call phrases of the respective users is calculated, and wherein when the i-vector indicating similarity has a value of 0.8 or more, the first utterer is determined to be a user belong to the group and the first utterer is asked to start a user registration process.

* * * * *